United States Patent [19]
Bransome

[11] Patent Number: 5,434,630
[45] Date of Patent: Jul. 18, 1995

[54] CORRECTIVE CONTACT LENS SYSTEM

[76] Inventor: Robert Bransome, 11611 Landing Pl., North Palm Beach, Fla. 33408

[21] Appl. No.: 126,917
[22] Filed: Sep. 27, 1993
[51] Int. Cl.$^6$ ................................................ G02C 7/04
[52] U.S. Cl. ................................ 351/162; 351/160 R; 351/160 H
[58] Field of Search ............... 351/160 R, 160 H, 161, 351/162, 177

[56] References Cited
U.S. PATENT DOCUMENTS
3,973,837  8/1976  Page .................................. 351/160 H FOREIGN PATENT DOCUMENTS
1276003  6/1972  United Kingdom ............... 351/162

Primary Examiner—Scott J. Sugarman
Attorney, Agent, or Firm—Juettner Pyle Lloyd & Piontek

[57] ABSTRACT

The contact lens system includes a large contact lens worn on the eye and a hard contact lens worn over the soft contact. One of the lenses is transparent. The other lens has an opaque area to prevent light from entering the eye except at a circular transparent area, to provide a piggyback light occluding lens system.

11 Claims, 1 Drawing Sheet

CORRECTIVE CONTACT LENS SYSTEM

BACKGROUND OF THE INVENTION

This invention relates to a contact lens system which is especially suitable for people having vision impairment problems which cannot be adequately corrected with the aid of a conventional contact lens, or glasses, or a combination of both.

It has been estimated that, on a worldwide basis, the number of people having a visual acuity of less then 20/200 is in excess of forty million. In many cases, severe visual problems cannot be resolved by the use of ordinary corrective lenses, and there is an ever present need to find non-intrusive solutions for vision impaired people.

SUMMARY OF THE INVENTION

It has been found that remarkable improvements in vision of visually impaired people may be made by providing a two lens system having particular features. A large soft contact lens is in floating contact with the surface of the eye, and a small, hard contact lens rides on the soft contact. One of the lenses is opaque, except for a small central circular area through the lens, which is transparent. The other lens is entirely transparent, to provide a light occluding piggyback lens system.

Preferably, the soft contact lens is the one provided with the circular transparent area. The diameter of the circular area is critical and is from about one to four mm and preferably 1.5 to 3.5 mm.

The lens system may be provided with or without corrective optics. Even without corrective optics, however, sharpness, clarity and depth of vision are greatly improved. This allows, for example, improvements in vision of people who could not otherwise be corrected by conventional lenses.

DESCRIPTION OF THE PREFERRED EMBODIMENTS

Figure 1:
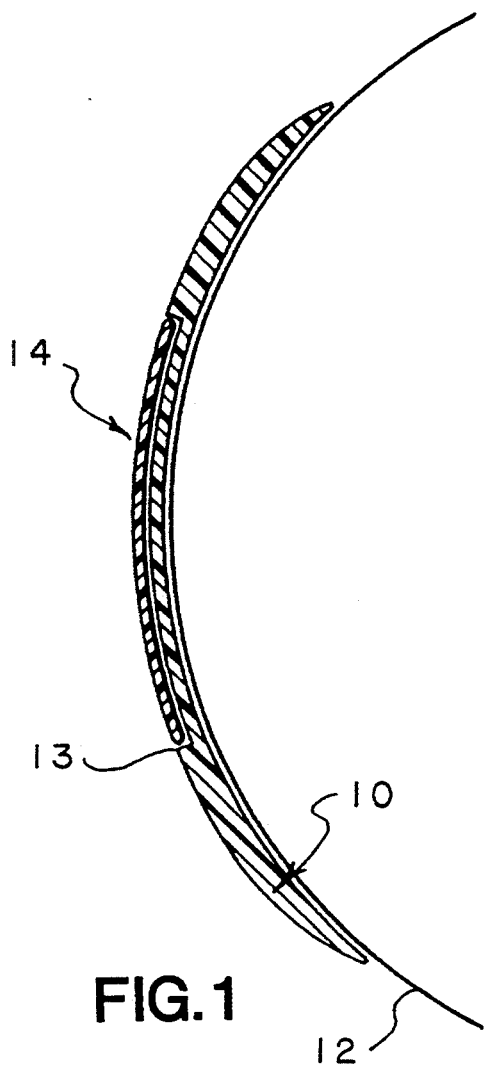
FIG. 1 is a sectional view through the lens system of the present invention.

FIG. 1 shows a soft contact lens 10 riding on the outer surface of the eye 12, and a smaller diameter hard contact lens 14 riding on the outer surface of the soft lens. In the particular embodiment shown, the soft contact lens 10 has a central depressed region 13 sufficiently large in diameter to receive and center the hard lens 14. The depressed central region is recommended but not essential, and any soft lens may be employed which is adapted to carry or receive a hard lens.

The lenses shown are manufactured from conventional polymeric materials and are widely available. They may or may not be provided with an optical correction, depending on the degree of vision improvement made possible by the present invention. Typical soft contact lenses are flexible and have a sufficient diameter for good stability, typically in the order of 13 to 15 mm. The hard contact lens is smaller in diameter, typically in the order of 6 to 8 mm, and is made from a rigid plastic. Thus, the terms "hard" and "soft" contact lenses as used herein are identical to the same terms as they are commonly used in the art. Both lenses may be gas permeable.

One of the lenses 10 or 14 is provided with an opaque region 18 or 20 to define a central round transparent area 22 or 24 disposed over the pupil of the eye 12. The opaque region 18 or 20 serves to substantially prevent entry of any light into the eye except through the transparent areas 22 or 24. Conveniently, and for cosmetic purposes, the opaque region 18 or 20 is circular and corresponds to the iris of the eye but not essential. Thus, the diameter of the opaque region is preferably equal to or greater than the diameter of the iris.

Figure 2:
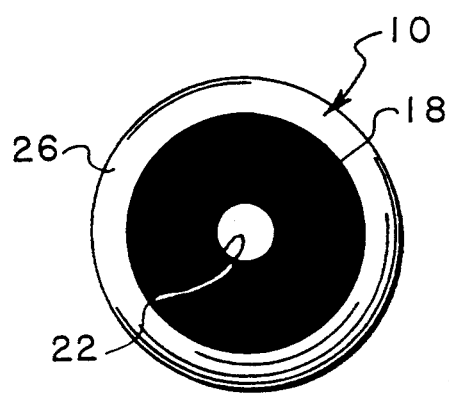
FIG. 2 is a plan view of a soft contact lens with a central transparent zone.

Many methods are known for providing an opaque color to a contact lens with a clear or transparent pupil area. For example, the central area may be masked, and the remaining area may be colored with a dye which is commercially available for this purpose. As shown in FIG. 2, a transparent outer annual band 26 may be allowed to remain for cosmetic reasons. Procedures for providing a contact lens with an opaque color region are described in U.S. Pat. Nos. 3,679,504, 4,252,421 and 4,468,279.

In the case of soft contact lenses, for example, kits are available for application of opaque dyes, such as the tinting system sold under the trademark "STECTRATINT" by Lamda Optical in England. Hard lenses can be tinted, painted or manufactured with the clear central area.

The diameter of the transparent area is critical. If the area is too small, insufficient light can enter the eye for proper vision. If the area is too large, no vision improvement is noted. The diameter of the transparent area or zone is from about 1 to about 4 mm, and best results from initial testing are obtained from an area having a diameter of from about 1.5 to 3.5 mm.

The use of the two lenses together in combination is also important. A single lens with a small transparent area may provide a small degree of vision improvement but not the large degree of unexpected improvement provided by the system of the present invention.

While a dramatic improvement in correction of vision has been demonstrated from the two lens system described herein, no adequate theory has been developed on why this two lens system is greatly superior to a single lens, except that possibly that an increased overall lens thickness is beneficial, or a compound lens is being emulated.

As a specific example, a 14.5 mm soft contact lens having a 0.3 mm total thickness was provided with a hollowed out circular center portion of reduced thickness. The soft lens was rendered light occluding except for a 3 mm circular area or transparent aperture by masking off the aperture and applying an opaque dye to the remainder of the lens. A 7 mm clear rigid lens having a 0.18 center thickness was applied over the soft lens. Both lenses were plano. Sharp corrected vision of 20/25+2 was obtained in the eye of a person which could not be corrected using ordinary lenses, glasses, or a combination of both.

Figure 3:
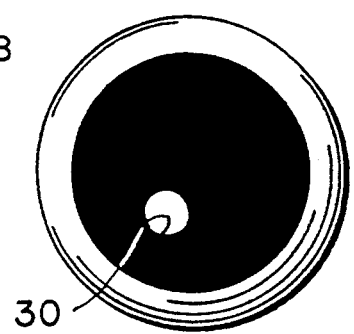
FIG. 3 is a plan view of a soft contact lens having the transparent zone located off center.
Figure 4:
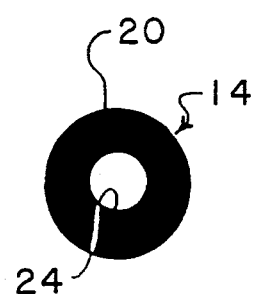
FIG. 4 is a plan view of a hard contact lens having a central transparent zone.

FIG. 3 shows the possibility of locating the transparent area 30 in a location away from the center of the lens. This may be appropriate, for example, in cases where the pupil is damaged or the iris has been removed or dilated.

I claim:

1. A contact lens system for correcting vision of the human eye, said system comprising a soft contact lens adapted to be worn directly on the eye, and a hard contact lens adapted to be worn over the soft lens, one of said lenses being transparent, the other of said lenses having an opaque area serving to block all light from entering the eye except for a circular transparent area through the lens, said circular transparent area having a diameter of from about one to about four millimeters, said system serving to improve vision irrespective of any corrective optics in said lenses.

2. The contact lens system of claim 1 wherein said other of said lenses is said soft contact lens.

3. The contact lens system of claim 1 wherein said other of said lenses is said hard contact lens.

4. The contact lens system of claim 1 wherein said circular transparent area has a diameter of from 1.5 to 3.5 millimeters.

5. The contact lens system of claim 1 wherein at least one of said lenses is provided with corrective optics.

6. The contact lens system of claim 1 wherein said soft contact lens comprises a central depressed area for receiving said hard contact lens.

7. The contact lens system of claim 1 wherein said circular transparent area is located centrally on said lens.

8. The contact lens system of claim 1 wherein said hard contact lens has a smaller diameter than said soft contact lens.

9. The contact lens system of claim 8 wherein said soft contact lens is flexible and said hard contact lens is rigid.

10. A contact lens system for improving the vision of the human eye, said system comprising a soft contact lens adapted to be worn directly on the eye, a circular transparent area in said soft contact lens having a diameter of about from one to about four millimeters, an opaque area in said soft contact lens around said transparent area of sufficient extent to block all light from entering the eye except through the transparent area, and a transparent hard contact lens adapted to be worn over said soft lens, said lens system serving to improve vision irrespective of any corrective optics in said lenses.

11. The contact lens system of claim 10 wherein said opaque area comprises an opaque dye.

* * * * *